Patented Nov. 18, 1941

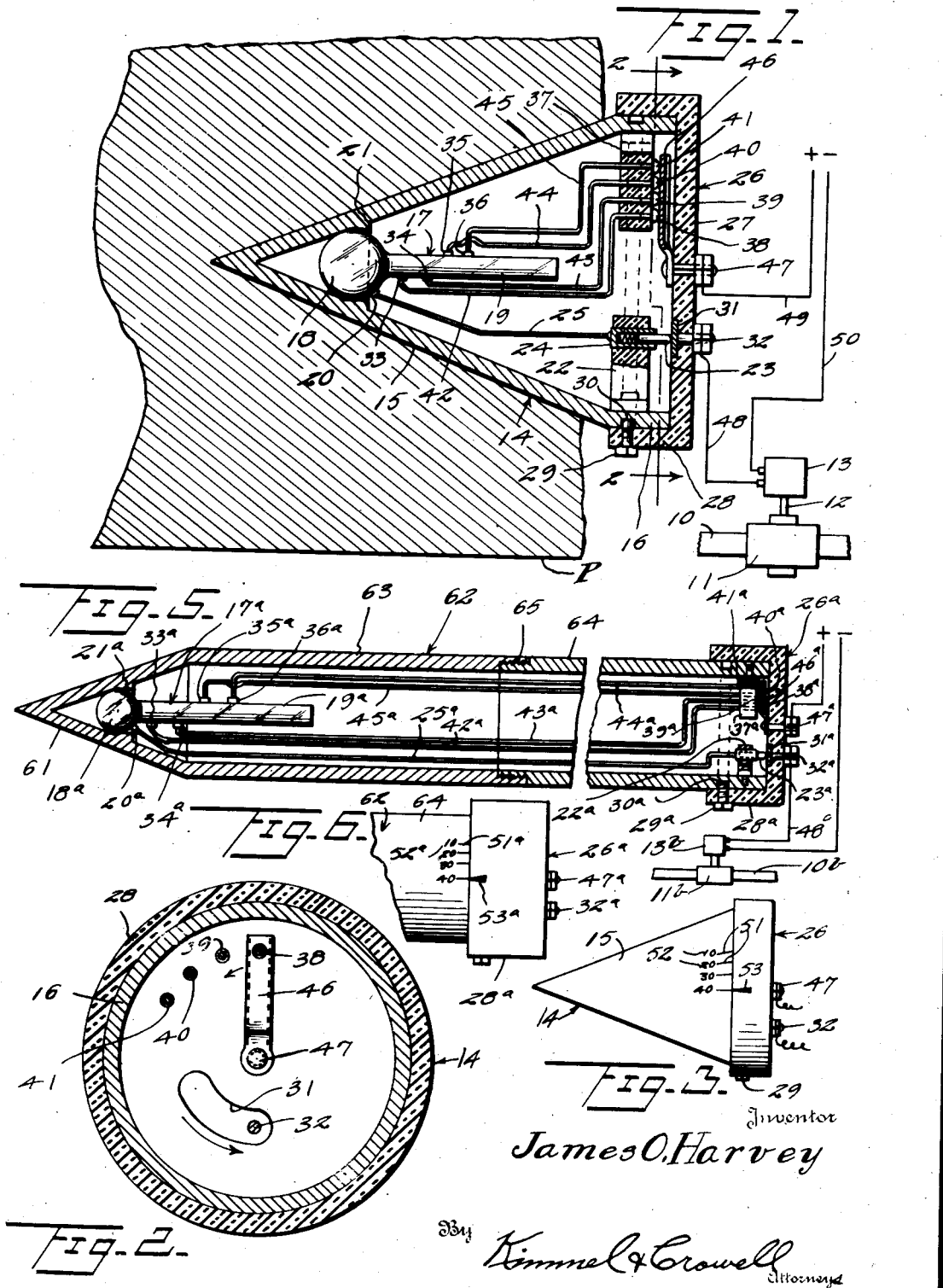

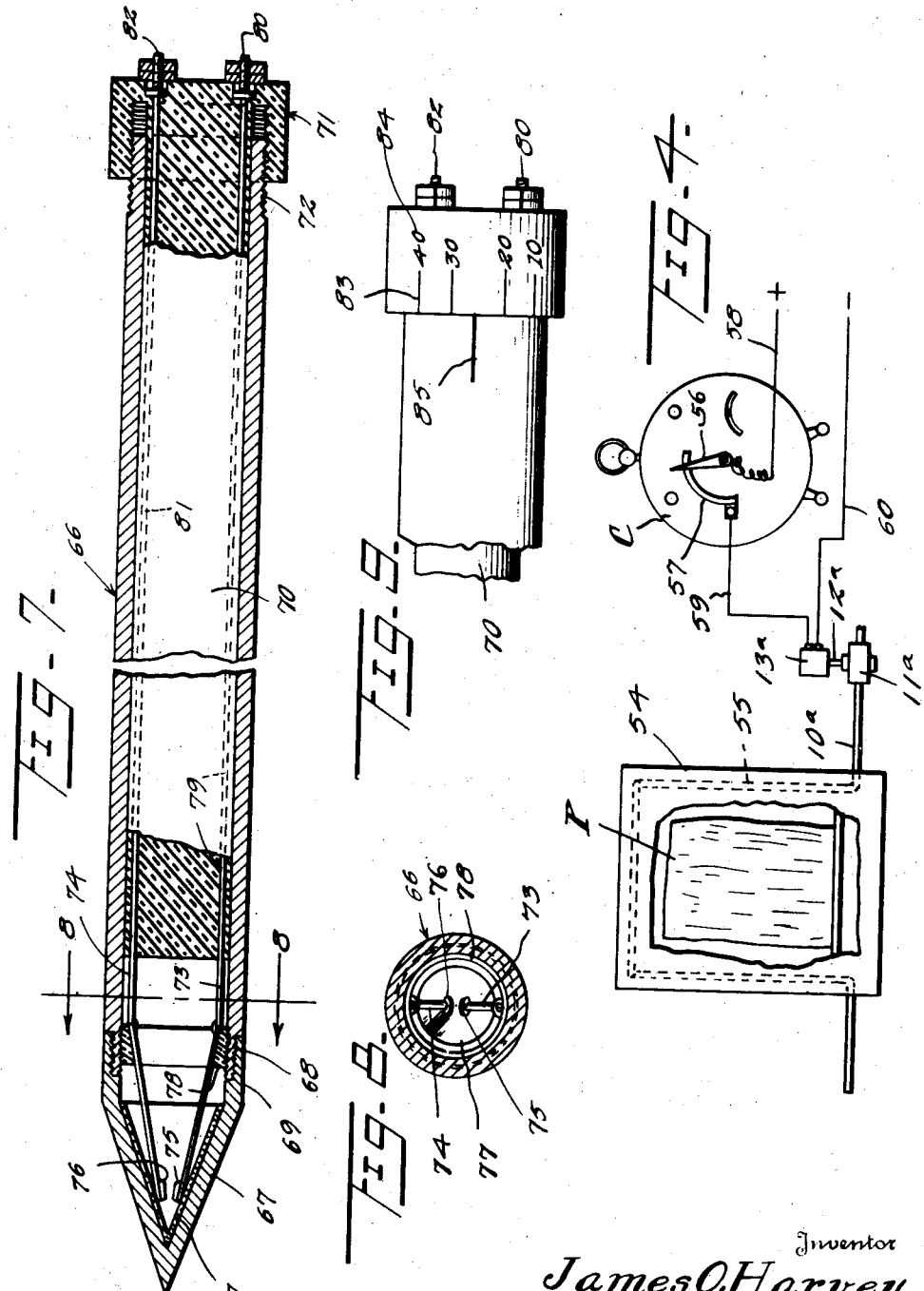

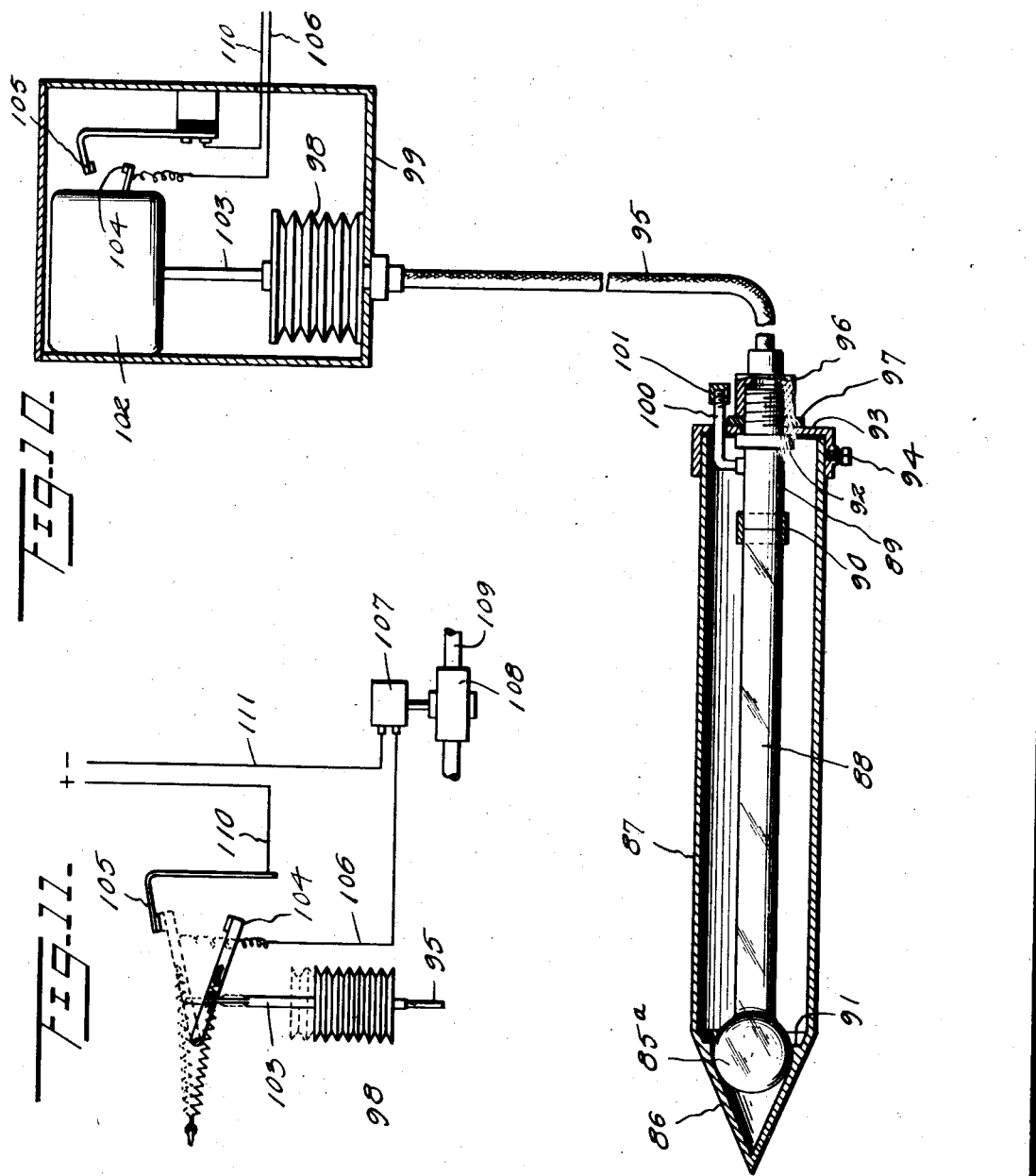

2,263,241

UNITED STATES PATENT OFFICE 2,263,241

MEANS FOR QUICK FREEZING FOOD PACKAGES

James O. Harvey, Sioux City, Iowa, assignor of one-half to Earl L. Mohr, Sioux City, Iowa Application December 22, 1939, Serial No. 310,614

7 Claims. (Cl. 62—2)

This invention relates to an improved means for regulating the temperature of an article of food, which is positioned in a quick freezing compartment.

An object of this invention is to provide an improved method of intially freezing an article or package of food so that the temperature of the article when removed from the freezing compartment will be of substantially the same temperature which is used in a cold storage compartment.

Another object of this invention is to provide in combination with a freezing means a thermostatic element, which is connected to the freezing means and is adapted to be projected into the article which is being frozen so as to thermostatically regulate the operation of the freezing means in accordance with the temperature of the article in the freezing compartment.

Another object of this invention is to provide in combination with a freezing apparatus an electrically controlled valve connected to the apparatus and time controlled means connected to an operating mechanism for the valve for operating said valve to a closed position after a predetermined period of time.

A further object of this invention is to provide an improved method of regulating the temperature of an article in a quick freezing compartment so as to eliminate the formation of ice crystals in the food product during the transfer of the article or product from the quick freezing compartment or chamber into a storage chamber.

A still further object of this invention is to provide a temperature regulating means, which is adapted to control the temperature within a freezing compartment, the controlling means being of such a character that it may be positioned in direct contact with the article so that the regulation of the freezing means is controlled by the temperature of the article.

At the present time in the freezing of food products, it is the practice to place the products in a quick freezing compartment which is adapted to freeze the product to temperatures varying from 25° to 50° below zero F. However, the freezing is accomplished by leaving the articles or food products in the freezing compartment for a predetermined length of time during which the articles or products are subjected to the desired low temperature and after the articles have been left in the freezing compartment for the desired time they are removed from the initial freezing compartment and placed in a storage or locker room, which has a normal temperature considerably above the initial temperature in the quick freezing compartment. It is, therefore, a further object of this invention to provide a controlling means for a quick freezing mechanism, which is adapted to be embedded or projected into the article which is inserted in the freezing compartment so that the article will initially act as an insulating means for the thermostatic controlling means to permit the operation of the freezing mechanism in the normal manner until the article has attained the desired low temperature at which time the controlling means is adapted to cut off the flow of the refrigerant to the freezing compartment.

To the foregoing objects and to others which may hereinafter appear, the invention consists of the novel construction, combination and arrangement of parts as will be more specifically referred to and illustrated in the accompanying drawings, wherein are disclosed embodiments of this invention, but it is to be understood that changes, variations and modifications may be resorted to which fall within the scope of the invention as claimed.

In the drawings:

Figure 1 is a longitudinal section of a thermostatic controlling means used in accordance with this invention, the controlling means being shown in combination with an electrically operated valve connected to the refrigerant line leading to the quick freezing compartment, the valve structure and connections to the controlling element are shown diagrammatically in this figure, Figure 2 is a sectional view taken on the line 2—2 Figure 1, Figure 3 is a detail side elevation of the controlling element, Figure 4 is a diagrammatic view of a time controlled means for a quick freezing compartment, Figure 5 is a longitudinal section partly diagrammatic and partly broken away of a modified form of this invention, Figure 6 is a fragmentary side elevation of the structure shown in Figure 5, Figure 7 is a longitudinal section partly broken away of a further modification of this invention, Figure 8 is a sectional view taken on the line 8—8 Figure 7, and Figure 9 is a fragmentary side elevation of the structure shown in Figure 7.

Figure 10 is a fragmentary vertical section of a further modification of this invention.

Figure 11 is a diagrammatic view of the circuit connections with the structure shown in Figure 10.

Referring to the drawings, and first to Figures 1, 2 and 3 the character P designates a food package or article, which is positioned within a quick freezing compartment. The freezing compartment is connected by the refrigerating line 10 having a valve 11 interposed therein. The valve 11 is of the spring pressed type, which is normally biased to a closed position. The valve 11 is provided with a stem 12 and a valve operating mechanism 13 is connected to the stem and is adapted, upon the closing of an electric circuit thereto to maintain the valve 11 in an open position. The construction of the mechanism 13 is conventional, being of the electromagnetic or solenoid type, the details of which are well known.

At the present time in the freezing of an article to a very low temperature, it is the practice to insert the article which is to be frozen within the freezing compartment and leave the article in the compartment for a predetermined length of time after which the article is removed and placed in a storage compartment having a temperature substantially higher than the temperature within the quick freezing compartment. With the structure or apparatus at present available, it is not possible to accurately determine the temperature of the article in the freezing compartment and in order to quickly freeze the article the temperature in the initial freezing compartment is maintained at a very low degree, which normally results in the freezing of the article of food at a considerably lower temperature than the normal temperature which is maintained in the storage compartment or locker room.

In order, therefore, to provide a means whereby the flow of the refrigerant to the quick freezing compartment may be cut off when the article positioned in the compartment has attained a predetermined low temperature, I have provided a thermostatic temperature regulating device generally designated as 14. This regulating device 14, as shown in Figure 1, is adapted to be forced into the article of food and left in the article during the time the article is positioned in the quick freezing compartment. The regulating member 14, shown in Figures 1, 2 and 3 comprises a cone-shaped body or housing 15, which is provided at the base or large end thereof with a substantially cylindrical portion or flange 16. The housing 15 has positioned therein a liquid thermal member 17, which comprises a bulb 18 and a tubular stem 19. A liquid in the form of mercury is adapted to be positioned within the thermal member 17 and a contact 20 is connected to the bulb 18. The bulb 18 is adapted to engage in a socket or seat 21, which is positioned at the small end of the housing 15 with the stem 19 projecting axially in the direction of the base thereof. An insulated support 22 is secured to the flange or cylindrical part 16 and a spring pressed contact 23 disposed in a sleeve 24 carried by the support 22 is connected by means of a conductor 25 to the contact 20. A cap 26 engages the flange 16 and comprises a plate 27 provided with a marginal cylindrical flange 28, which is rotatably secured to the flange 16 by means of screws or pins 29. The screws or pins 29 engage in an annular groove 30 provided in the flange 16 so that the cap 26 may be rotated relative to the flange 16. The cap 26 is provided on the inner side thereof with an arcuate contact strip 31, which is connected to a terminal 32 extending through the plate 27. The contact 23 is adapted to wipe the terminal strip 31 so as to hold the conductor 25 in constant engagement with the terminal strip 31 in any adjusted position of the cap 26. The stem portion 19 of the thermal member 17 is provided with a plurality of spaced apart contacts 33, 34, 35 and 36. The contact 33 is the lowermost contact and the contact 36 is the outermost or highest temperature contact.

A second supporting member 37 of insulated construction is secured to the flange 16 and if desired may be formed as a part of the supporting member 20. The supporting member 37 is provided with contact members 38, 39, 40 and 41. The contact 38 is connected to the contact 33 by a conductor 42 and the contact 39 is connected to the contact 34 by a conductor 43. The contact 40 is connected to the contact 35 by a conductor 44 and the contact 41 is connected to the contact 36 by a conductor 45. A movable wiper 46 of resilient construction is secured by a fastening member 47 in the form of a terminal at the axial center of the cap 26 and is adapted to selectively engage with the contacts 38, 39, 40 and 41. The terminal 32 is connected by a wire or conductor 48 to one side of the mechanism 13 and the terminal 47 is connected by a conductor 49 to one side of a source of electric current supply. The other side of the current supply is connected by a wire or conductor 50 to the other side of the mechanism 13. The conductors 25 and 42 to 45 inclusive, may be of relatively stiff wire so that these conductors will yieldably hold the thermal element 17 with the bulb 18 thereof engaging in the socket 21.

The exterior of the housing 15 may be provided with a series of graduations 51 having indicia 52 associated therewith and these graduations 51 are associated with the contacts 38 to 41, inclusive. A pointer 53 may be positioned on the exterior of the flange 28 so that the cap 26 may be rotated to a selected graduation 51 for connecting the terminal 47 with the desired contact on the stem 19 of the thermal member 17. In this manner the thermal member 17 can be regulated so as to automatically break the electric circuit to the valve operating mechanism 13 when the temperature of the article P reaches a predetermined low degree.

Referring now to Figure 4, the numeral 54 designates generally a quick freezing compartment which has a refrigerant line 55 connected thereto; the refrigerant line 55 is connected by a pipe 10ᵃ and a valve 11ᵃ is interposed in the refrigerant supply line 10ᵃ. An electrically operated valve operating mechanism 13ᵃ is connected to the valve stem 12ᵃ and this mechanism 13ᵃ is adapted upon energization thereof to hold the valve 11ᵃ in normally open operative position. When the mechanism 13ᵃ is deenergized the valve structure 11ᵃ is adapted to be yieldably moved to a closed position. An article of food P is adapted to be positioned within the freezing compartment 54 and in order to provide a means whereby the article P in the compartment 54 may be frozen to the desired degree, I have provided a clock C, which has a movable switch arm 56 connected to the desired shaft or rotatable part thereof. The switch arm or wiper 56 is adapted to engage an arcuate terminal or contact 57, which is fixed to the clock C and the wiper 56 is connected by conductor 58 to one side of a source of electric current supply. A conductor 59 is connected to the contact 57 and to one side of the mechanism 13ª. The other side of the mechanism 13ª is connected by a wire 60 to the other side of the current supply. With a construction of this kind the food article P is positioned in the freezing compartment 54 and the wiper or contact arm 56 is initially started at one end of the arcuate contact strip 57. When the clock C operates the arm 56 will move over the strip 57 for the length of the strip 57 and when the wiper 56 is disengaged from the contact strip 57, the electric circuit to the mechanism 13ª will be broken, thus permitting the valve 11ª to be yieldably moved to a closed position and prevent the further flow of refrigerant through the supply line 10ª and the freezing coil 55.

Referring now to Figures 5 and 6, there is disclosed another modified form of this invention. A thermostatic element 17ª similar to the element 17 is adapted to have the bulb 18ª thereof positioned in a socket 21ª formed in a cone shaped article piercing point 61. The point 61 is formed as part of a tubular housing generally designated as 62. The housing 62 in a present instance is formed with an outer cylindrical part 63 and an inner cylindrical part 64. The two parts 63 and 64 are coupled together by means of threads 65. The bulb 18ª has a contact 20ª connected thereto and also has a plurality of contacts 33ª, 34ª, 35ª and 36ª, which are spaced apart longitudinally of the stem 19ª, which communicates with the bulb 18ª. Contact 20ª is connected by means of conductor 25ª to a resilient or spring pressed contact 23ª, which is carried by an insulated support 22ª at the end of the housing 62 oppositely from the point 61. A flanged cap 26ª is rotatably mounted on the outer end of the tubular housing 62 being swivelly mounted thereon by means of a lug or pin 29ª engaging in a groove 30ª provided in the periphery of the outer tubular member 64. The cap 26ª is similar in every detail to the cap 26, being provided with an arcuate contact 31ª, which is connected to a terminal post 32ª. The contact 23ª is adapted to wipe on the inner surface of the arcuate contact strip 31ª. The cap 26ª is also provided with a wiper 46ª, which is secured at the axial center of the cap 26ª by means of a terminal post 47ª; the wiper 46ª extending radially from the terminal 47ª. An insulated supporting member 37ª is mounted within the tubular member 64 and the supporting member 37ª is provided with contacts 38ª, 39ª, 40ª and 41ª. The contact 38ª is connected to the contact 33ª by a conductor 42ª and the contact 39ª is connected to the contact 34ª by a conductor 43ª. The contact 40ª is connected by a conductor 44ª to the contact 35ª and the contact 41ª is connected by a conductor 45ª to the contact 36ª. The periphery of the outer housing member 64 is provided with a plurality of graduations 51ª with which indicia 52ª are associated. The flange 28ª of the cap 26ª is provided with a pointer 53ª, which cooperates with the graduations 51ª in determining the position of the wiper 46ª relative to the contacts 38ª to 41ª inclusive. The terminal 32ª is adapted to be connected by means of a wire 48ª to one side of an electrical valve operator 13ᵇ, which is connected to a valve 11ᵇ interposed in a refrigerant line 10ᵇ. The line 10ᵇ is adapted to be connected to a refrigerant coil positioned in a quick freezing compartment so that opening or closing of the electric circuit to the operator 13ᵇ will effect opening or closing of the valve 11ᵇ.

In Figures 7 to 9, inclusive, there is disclosed a further modification of this invention wherein a tubular member 66 is provided at one end thereof with a conical article piercing point 67. Preferably the tubular member 66 is provided adjacent the pointed end thereof with threads 68 and a cylindrical part 69 is formed with the base of the point 67 and is threaded onto the threaded portion 68 so that the point 67 may be removed from the tubular member 66. An insulated core 70 is positioned within the tubular member 66 and is provided at its rear end with an insulated cap 71. The cap 71 is adapted to engage threads 72, which are formed on the periphery of the tubular member 66 so that the cap 71 may be rotated for the purpose of regulating the operation of the thermostatic means. A pair of bimetallic resilient members 73 and 74 are secured at their inner ends to the core or plug 70, and if desired may be embedded within the material forming the core 70. The outer end of the bimetallic member 73 is provided with a contact 75 and the outer end of the bimetallic member 74 is provided with a contact 76 confronting the contact 75. The two bimetallic members 73 and 74 are so constructed that when a predetermined low degree of temperature is attained within the article in which the tubular member 66 is embedded, the members 73 and 74 will move away from each other so as to space the contacts 75 and 76 apart and thus break the electric circuit associated with the bimetallic members 73 and 74. The point 67 on the inner surface thereof may be provided with an insulated cone-shaped member 77 so as to prevent the shorting of the electric circuit when the two members 73 and 74 are in a circuit breaking position. In order to provide a means whereby the thermostatic members 73 and 74 may be tensioned I have provided an insulated ring 78, which is threaded into the adjacent end of the tubular member 67. The inner surface of this ring 78 is preferably of frusto-conical configuration so that manual adjustment of the core 70 in one direction will tension the thermostatic members 73 and 74 and manual adjustment in the other direction will reduce the tension on these thermostatic members. The increase in the tension on these thermostatic members 73 and 74 will have the effect of requiring a lower degree of temperature to move the contacts 75 and 76 apart whereas the decrease of the tension on these members will permit these members to move apart at a higher degree of temperature.

The strip 73 is connected to a conductor 79, which extends through the core 70 and is connected to a terminal 80 carried by the cap 71. The strip 74 is connected to a conductor 81, which is embedded in the core 70 and is connected to a second terminal 82 carried by the cap 71. The exterior of the cap 71 may be provided with graduations 83 having indicia 84 associated therewith and a pointer 85 may be mounted on the tubular member 66 and associated with the graduations 83 so that the user of this device may be able to determine at what degree of temperature the bimetallic strips 73 and 74 will break the electric circuit associated therewith. The terminals 80 and 82 are adapted to be connected to a valve operating mechanism similar to that shown in Figure 1, which is connected to a refrigerant pipe line leading to a quick freezing compartment.

In use and operation of the device shown in Figures 1, 2 and 3 the body 14 is forced into the food product P and this product then placed in the quick freezing compartment. At the time the controlling member 14 is inserted in the food product P, the temperature of the food product and of the controlling member 14 is such that the electric circuit to the valve operating mechanism 13 will be closed. The closing of the circuit to the mechanism 13 will provide for the latter to hold the valve 11 in an open position so that the refrigerant compartment may be supplied with the desired refrigerant. It will, of course, be understood that the quick freezing compartment in which the product P is placed is at a predetermined low temperature, which may be lower than the temperature at which the controlling member 14 will break the circuit to the mechanism 13. In this manner the food product will be quickly cooled and when the product has been cooled to the desired low temperature irrespective of the temperature of the atmosphere in the freezing compartment the thermostatic member or element 17 will break the electric circuit to the mechanism 13, when the mercury in the stem 19 uncovers the selected contact on this stem.

The thermostatic member shown in Figures 5 to 9, inclusive, may be projected into the food products to a greater degree as the controlling members shown in Figures 5 to 9 are constructed in the form of metallic skewers and a portion of each of these members may be left projecting outwardly of the food products so as to form a handle for withdrawing the controlling member from the food product after the product has been cooled or frozen to the desired low temperature. Preferably the food product is frozen to a temperature slightly below the temperature normally maintained in the storage locker room, so that during the time the product is being transported from the quick freezing means to the locker room the temperature of the product will not rise above the temperature normally maintained in the locker room.

In Figures 10 and 11 there is disclosed a further modification of this invention wherein a bulb 85ᵃ is mounted in the conical hollow point 86 carried by one end of a cylindrical body 87. The bulb 85ᵃ has cylindrical tube 88 communicating therewith and the tube 88 is connected to a short metal tube 89 by means of a connector 90. The tube 88 and the bulb 85ᵃ are preferably formed of glass. The bulb 85ᵃ engages a seat 91 formed in the conical point 86 adjacent the base thereof and the short tube 89 is provided with a flange or rib 92 engaging against the inner face of a cap 93 which is secured to the opposite end of the body 87. The cap 93 is firmly held on the body 87 by means of set screws 94.

One end of a flexible hose 95 is connected by means of a connector 96 to the pipe 89 and gasket 97 is interposed between the connector 96 and the cap 93. The opposite end of the hose 95 is connected to a bellows or expansible member 98 which is mounted in a housing 99 positioned remote from the body 87. The bellows 98 together with the hose 95 and the bulb 85ᵃ and the tubes 88 and 89 are adapted to contain volatile liquid refrigerant which will expand under temperature changes so as to effect an expansion or contraction of the bellows or switch operator 98. The short tube 89 is provided with a filling tube 100 having a cap 101 threaded thereon so that the expansible fluid may be inserted in the tube 89 and fill the tube 88, the bulb 85ᵃ, the hose 95 and the bellows 98.

The bellows 98 is operatively connected to a snap switch structure 102 by means of a link 103. The snap switch structure 102 is a conventional switch structure which is adapted to be snapped on or off by movement of the link 103 under the expansion or contraction of the bellows 98. The switch structure 103 includes a movable contact 104 and a stationary contact 105. The movable contact 104 as shown in Figure 11 is connected by means of a conductor 106 to one side of an electrically operated valve operating mechanism 107 which is similar to the mechanism 13. The mechanism 107 is operatively connected to a valve 108 interposed in a refrigerant fluid line 109 which is connected to a quick freezing chamber. The stationary contact 105 is connected by means of a conductor 110 to one side of a source of electric current supply and the other side of the current supply is connected by a conductor 111 to the other side of the mechanism 107.

The tubular member 87 with the point 86 is adapted to be projected bodily into the food package so that the temperature of the food package will cause either an expansion or contraction of the refrigerant fluid contained in the switch controlling structure. Initially the temperature of the fluid is relatively high so that the bellows 98 will be expanded by the expansion of the volatile liquid refrigerant contained therein. As the temperature of the food package drops under the action of the refrigerant in the quick freezing chamber, the bellows 98 will contract and when the bellows 98 has contracted to a predetermined degree, the movable contact 104 forming part of the snap switch structure will be moved to a circuit breaking position thus permitting the valve 108 to be yieldably moved to a closed position. This valve 108 is a conventional valve structure which is normally biased to a closed position. The cylindrical body 87 and the point 86 are constructed in the form of a skewer which may be projected bodily into the food package and subsequently withdrawn after the package has been frozen to the desired degree.

By providing the hereinbefore described method and means of cooling an article of food or a food package, it will be possible for the attendant or user to more readily determine when the food product has been cooled to the desired degree as this may be done by glancing at the valve operating mechanism or the valve associated with the particular compartment to see whether the valve connected to the refrigerant line leading to a particular compartment is in either open or closed position.

What I claim is:

1. Means for quickly freezing a food package comprising in combination, a freezing chamber for receiving the package, a refrigerant conducting line correlating with said chamber for reducing the temperature therein, a controlling valve for said line normally biased to a closed position, a closed housing for extension from an end thereof into the package, an electrically operating mechanism for opening said valve including an operating circuit having a pair of terminals connected to the housing, and a thermostatic controlling structure for said mechanism within said housing correlating with said terminals and said terminals and adapted when the housing is initially inserted in the package for closing said circuit whereby said mechanism will open said valve and when the temperature lowers to a predetermined degree within the package and the housing for opening said circuit whereby said valve will automatically move to closing position with respect to said line.

2. Means for quickly freezing a food package comprising in combination, a freezing chamber for receiving the package, a refrigerant conducting line correlating with said chamber for reducing the temperature therein, a controlling valve for said line normally biased to a closed position, a closed housing for extension from an end thereof into the package, an electrically operated mechanism for opening said valve including an operating circuit having a pair of terminals connected to the housing and provided with contacts, and a thermostatic controlling structure for said mechanism within said housing correlating with said contacts and adapted when the housing is initially inserted in the package for closing said circuit whereby said mechanism will open said valve and when the temperature lowers to a predetermined degree within the package and the housing for opening said circuit whereby said valve will automatically move to closing position with respect to said line.

3. Means for quickly freezing a food package comprising in combination, a freezing chamber for receiving the package, a refrigerant conducting line correlating with said chamber for reducing the temperature therein, a controlling valve for said line normally biased to a closed position, a tubular housing having a conical piercing point at one end for extension into the package, a liquid thermostatic element in said housing, spaced contacts carried by said element, a cap rotatably carried by the other end of said housing, a plurality of contacts in said housing inwardly of said cap, means connecting said first contacts with said second contacts, an arcuate wiper carried by said cap and engageable with one of said latter contacts, an electrically operated mechanism for opening said valve including an operating circuit having a terminal connected to said wiper and a terminal connected to said cap, a yieldable switch arm connected to said second terminal and engageable with a selected one of the remaining of said latter contacts, and said element adapted when the housing is initially inserted in the package for closing said circuit whereby said mechanism will open said valve and when the temperature lowers to a predetermined degree within the package and the housing for opening said circuit whereby said valve will automatically move to closing position with respect to said line.

4. The invention as set forth in claim 2 having said housing formed of a body portion having a closed pointed end, an open end and a revoluble closure for said open end, means for revolubly connecting the closure to said body portion for adjustment, said contacts and terminals being carried by said closure, one of said contacts constituting a wiper permanently engaging with a part of said structure and the other of said contacts for selective engagement with other parts of said structure.

5. The invention as set forth in claim 2 having said housing formed with an open end and a revoluble closure for said end, said structure including a bulb, a stem, a series of conductors extending from the stem for selectively engaging with one of said contacts, a single conductor extended from said bulb for permanent engagement with the other of said contacts, means within the housing for supporting the said conductors and said housing having means correlating with said series of conductors for supporting said bulb and stem.

6. Means for quickly freezing a food package comprising in combination a freezing chamber for receiving the package, a refrigerant conducting line correlating with said chamber for reducing the temperature in the latter, a controlling valve for said line normally biased to a closed position, a closed housing for extension from an end thereof into said package, said housing including a body portion open at its other end and a revoluble closure for such open end, an electrically operated mechanism for opening said valve including an operating circuit having a pair of terminals attached to and bodily movable with said closure, a liquid thermostatic element within the housing including a bulb and a stem, a plurality of electrical conductors electrically connected at one end to said stem and each provided with a contact at its other end, a resilient contact bodily shiftable with said closure for selectively engaging the contacts of said conductors and electrically connected to one of said terminals, a wiping contact electrically connected to the other of said terminals and bodily moving with said closure, a single electrical conductor electrically connected at one end to said bulb and including a spring controlled contact at its other end in permanent electrical engagement with said wiping contact, and said element, said conductors and the contacts of said conductors correlating with said resilient and wiping contacts to provide when the housing is initially inserted in the package for closing said circuit whereby said mechanism will open said valve and when the temperature lowers to a predetermined degree within the package in the housing for opening said circuit whereby said valve will automatically move to closing position with respect to said line.

7. The invention as set forth in claim 6 having said housing provided therein with means for suspending said conductors at the contact end thereof, and said housing provided with means correlating with said conductors for supporting the liquid thermostatic element in the housing.

JAMES O. HARVEY.